(12) United States Patent
Kinoshita et al.

(10) Patent No.: US 9,831,747 B2
(45) Date of Patent: Nov. 28, 2017

(54) MOTOR-DRIVEN COMPRESSOR

(71) Applicant: KABUSHIKI KAISHA TOYOTA JIDOSHOKKI, Kariya-shi, Aichi-ken (JP)

(72) Inventors: Yusuke Kinoshita, Kariya (JP); Ken Suitou, Kariya (JP); Tatsushi Mori, Kariya (JP); Kazuhiro Kuroki, Kariya (JP); Tatsuya Koide, Kariya (JP); Junya Yano, Kariya (JP); Takuro Mizuno, Kariya (JP)

(73) Assignee: KABUSHIKI KAISHA TOYOTA JIDOSHOKKI, Kariya-Shi, Aichi-Ken (JP)

( * ) Notice: Subject to any disclaimer, the term of this patent is extended or adjusted under 35 U.S.C. 154(b) by 386 days.

(21) Appl. No.: 14/463,885

(22) Filed: Aug. 20, 2014

(65) Prior Publication Data
US 2015/0054365 A1 Feb. 26, 2015

(30) Foreign Application Priority Data
Aug. 23, 2013 (JP) ................................. 2013-173264

(51) Int. Cl.
*H02K 11/00* (2016.01)
*H02K 5/10* (2006.01)
(Continued)

(52) U.S. Cl.
CPC ........... *H02K 11/0073* (2013.01); *H02K 5/06* (2013.01); *H02K 5/10* (2013.01); *H02K 11/01* (2016.01); *H02K 11/33* (2016.01); *H02K 5/225* (2013.01)

(58) Field of Classification Search
CPC ............. H02K 11/01; H02K 11/02022; H02K 11/024; H02K 11/30; H02K 11/33; H02K 11/40
(Continued)

(56) References Cited

U.S. PATENT DOCUMENTS

| | | | |
|---|---|---|---|
| 2004/0145860 A1* | 7/2004 | Shindo | ................ B60R 16/0239 361/622 |
| 2010/0074772 A1 | 3/2010 | Hoshino et al. | |
| 2012/0237376 A1 | 9/2012 | Kinoshita et al. | |

FOREIGN PATENT DOCUMENTS

| | | | |
|---|---|---|---|
| JP | 03128640 A | * | 5/1991 |
| JP | 4-105951 U | | 9/1992 |

(Continued)

OTHER PUBLICATIONS

Tamura, Machine Translation of JP03128640, May 1991.*
Yasuda, Machine Translation of JP2009257292, Nov. 2009.*

*Primary Examiner* — Quyen Leung
*Assistant Examiner* — Eric Johnson
(74) *Attorney, Agent, or Firm* — Sughrue Mion, PLLC (57) ABSTRACT

A motor-driven compressor includes a metal housing accommodating a compression unit and an electric motor and a cover coupled to the housing. The cover and the housing define an accommodation chamber that accommodates a motor driving circuit that drives the electric motor. The cover includes a metal shield that blocks electromagnetic noise, a resin outer insulator that is fixed to an outer side of the shield and includes an outer circumferential portion, and a resin inner insulator that is fixed to an inner side of the shield and includes an outer circumferential portion. The shield, the outer insulator, and the inner insulator are separate from one another and stacked together. The shield is held between the outer insulator and the inner insulator. The outer circumferential portion of the outer (Continued)

insulator is joined to the outer circumferential portion of the inner insulator.

7 Claims, 4 Drawing Sheets

(51) Int. Cl.
    *H02K 5/22*     (2006.01)
    *H02K 5/06*     (2006.01)
    *H02K 11/01*     (2016.01)
    *H02K 11/33*     (2016.01)

(58) Field of Classification Search
    USPC .......................................... 417/423.7, 423.14
    See application file for complete search history.

(56) References Cited

FOREIGN PATENT DOCUMENTS

| JP | 2008-215236 A | | 9/2008 |
|---|---|---|---|
| JP | 2009257292 A | * | 11/2009 |
| JP | 2012193660 A | | 10/2012 |

\* cited by examiner

MOTOR-DRIVEN COMPRESSOR

BACKGROUND OF THE INVENTION

The present invention relates to a motor-driven compressor.

A motor-driven compressor includes a metal housing accommodating a compression unit, which compresses and discharges refrigerant, and an electric motor, which drives the compression unit. A cover that defines an accommodation chamber is coupled to the housing. The accommodation chamber accommodates a motor driving circuit that drives the electric motor.

When the cover is made of metal, the overall weight of the motor-driven compressor increases. The use of a resin cover allows the motor-driven compressor to be lighter. However, a resin cover would transmit electromagnetic noise from outside the compressor to the motor driving circuit. In addition, electromagnetic noise from the motor driving circuit may leak out of the compressor through the resin cover.

Accordingly, in Japanese Laid-Open Patent Publication No. 2008-215236, a metal conductor (shield) is stacked on and fixed to a resin insulator. Electromagnetic noise from the exterior is blocked by the conductor and transmitted to a housing. This limits the electromagnetic noise that enters an accommodation chamber, which accommodates a motor driving circuit, through the insulator. In addition, electromagnetic noise from the motor driving circuit is blocked by the conductor and transmitted to the housing. This limits the leakage of electromagnetic noise from the motor driving circuit to the exterior through the insulator.

When the outer surface of the conductor is exposed, the ambient air may erode the conductor. Thus, an insulator (outer insulator) may be fixed to the outer surface of the conductor. The insulator covers the outer surface of the conductor so that the conductor is not exposed to the ambient air. Further, to insulate the motor driving circuit from the conductor, an insulator (inner insulator) may be stacked on and fixed to the inner surface of the conductor so that the insulator is located between the motor driving circuit and the conductor.

Molding may be performed to form such a three-layered cover including insulators fixed to the outer and inner surfaces of the conductor. Specifically, when a conductor is arranged in a mold, the mold is filled with molten resin at the inner and outer sides of the conductor. The molten resin is then hardened to form resin insulators that are stacked on and fixed to the inner and outer surfaces of the conductor. This forms the three-layered cover including insulators fixed to the outer and inner surfaces of the conductor.

When the cover is returned to room temperature after being molded, the conductor, the outer insulator, and the inner insulator undergo thermal contraction. Since the linear expansion coefficient of the conductor differs from that of the insulators, the degree of thermal contraction of the conductor differs from that of the insulators. The adherence between the conductor and the insulators may hinder smooth contraction of each layer. This may deform the conductor and insulators during the thermal contraction. As a result, the desired shape and dimensional accuracy may not be obtained with the cover.

SUMMARY OF THE INVENTION

It is an object of the present disclosure to provide a motor-driven compressor that includes a cover having the desired shape and high dimensional accuracy.

To achieve the above object, one aspect of the present invention is a motor-driven compressor including a metal housing accommodating a compression unit and an electric motor and a cover coupled to the housing. The cover and the housing define an accommodation chamber that accommodates a motor driving circuit that drives the electric motor. The cover includes a metal shield that blocks electromagnetic noise, a resin outer insulator that is fixed to an outer side of the shield and includes an outer circumferential portion, and a resin inner insulator that is fixed to an inner side of the shield and includes an outer circumferential portion. The shield, the outer insulator, and the inner insulator are separate from one another and stacked together. The shield is held between the outer insulator and the inner insulator. The outer circumferential portion of the outer insulator is joined to the outer circumferential portion of the inner insulator.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

Referring to FIGS. 1A to 4B, a motor-driven compressor of one embodiment will now be described. The motor-driven compressor is installed in a vehicle and used with a vehicle air-conditioning device.

Figure 1A:
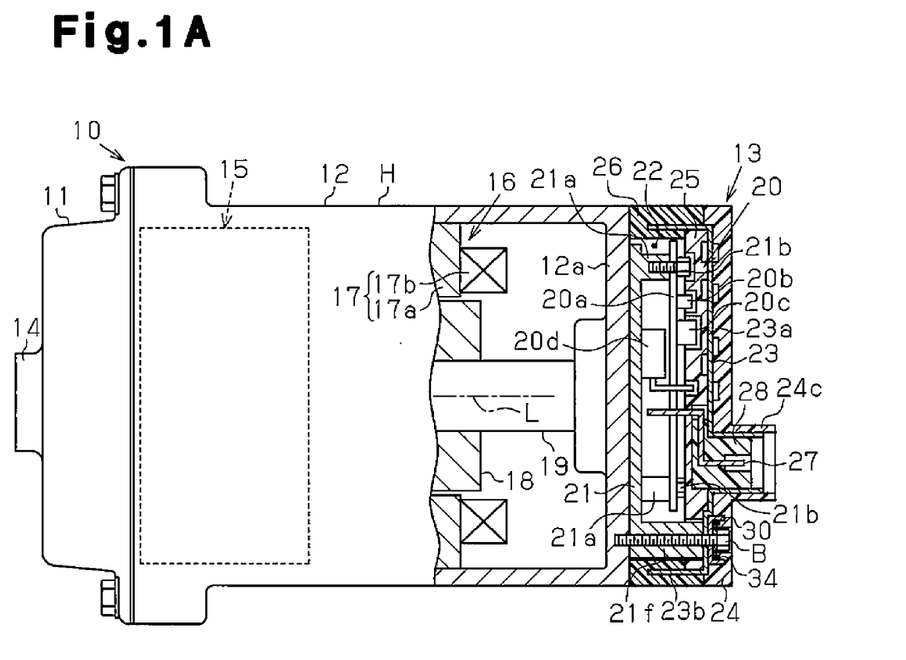
FIG. 1A is a partially cross-sectional view showing a motor-driven compressor of one embodiment.

As shown in FIG. 1A, a motor-driven compressor 10 includes a housing H that includes a cylindrical discharge housing member 11 and a cylindrical suction housing member 12 coupled to the discharge housing member 11. The discharge housing member 11 and the suction housing member 12 are made of a metal, preferably aluminum, and each includes an open end and a closed end. The suction housing member 12 has a circumferential wall including a suction port (not shown). The suction port is connected to an external refrigerant circuit (not shown). The discharge housing member 11 includes a discharge port 14 connected to the external refrigerant circuit. The suction housing member 12 accommodates a compression unit 15 (indicated by the broken lines in FIG. 1A), which compresses refrigerant, and an electric motor 16, which drives the compression unit 15. Although not shown in the drawings, the compression unit 15 of the present embodiment includes a fixed scroll, which is fixed in the suction housing member 12, and a movable scroll, which faces the fixed scroll.

A stator 17 is fixed to the inner surface of the suction housing member 12. The stator 17 includes a stator core 17a, which is fixed to the inner surface of the suction housing member 12, and coils 17b, which are wound around teeth (not shown) of the stator core 17a. A rotatable rotation shaft 19 extends through the stator 17 in the suction housing member 12. A rotor 18 is fixed to the rotation shaft 19.

The suction housing member 12 has an end wall 12a to which a cover 13 is coupled. The cover 13 is cylindrical and includes an open end and a closed end. A planar coupling base 21 is arranged between the suction housing member 12 and the cover 13. The coupling base 21 is made of a metal, preferably aluminum. The coupling base 21 is coupled to the end wall 12a of the suction housing member 12. The coupling base 21 is thermally coupled to the suction housing member 12. The coupling base 21 forms a portion of the suction housing member 12 (housing H).

The cover 13 and the coupling base 21 define an accommodation chamber 22. The accommodation chamber 22 accommodates a motor driving circuit 20 that drives the electric motor 16. The motor driving circuit 20 includes a flat circuit board 20a and a plurality of electric components 20b, 20c and 20d, which are electrically connected to the circuit board 20a.

The surface of the coupling base 21 opposite to the end wall 12a of the suction housing member 12 includes a plurality of bosses 21a extending in the axial direction of the rotation shaft 19. The circuit board 20a is coupled to the bosses 21a by fastening coupling bolts 21b to the bosses 21a. The motor driving circuit 20 is connected to the electric motor 16 by wires (not shown). In the present embodiment, the compression unit 15, the electric motor 16, and the motor driving circuit 20 are arranged in this order along the axis L of the rotation shaft 19 (in the axial direction).

In the present embodiment, the circuit board 20a, the electric components 20b, 20c and 20d, and the coupling bolts 21d serve as components of the motor driving circuit 20.

The cover 13 includes a shield 23, a planar outer insulator 24, which is fixed to the outer side (outer surface) of the shield 23, and a planar inner insulator 25, which is fixed to the inner side (inner surface) of the shield 23. The shield 23 is formed from a thin plate made of a metal, preferably aluminum, and blocks electromagnetic noise. The outer and inner insulators 24 and 25 are made of resin. The shield 23 and the insulators 24 and 25 are stacked together. The shield 23 includes a flat lid 23a, which is held between the outer insulator 24 and the inner insulator 25, and a tubular portion 23b, which extends from the rim of the lid 23a in the axial direction of the rotation shaft 19.

Figure 1B:
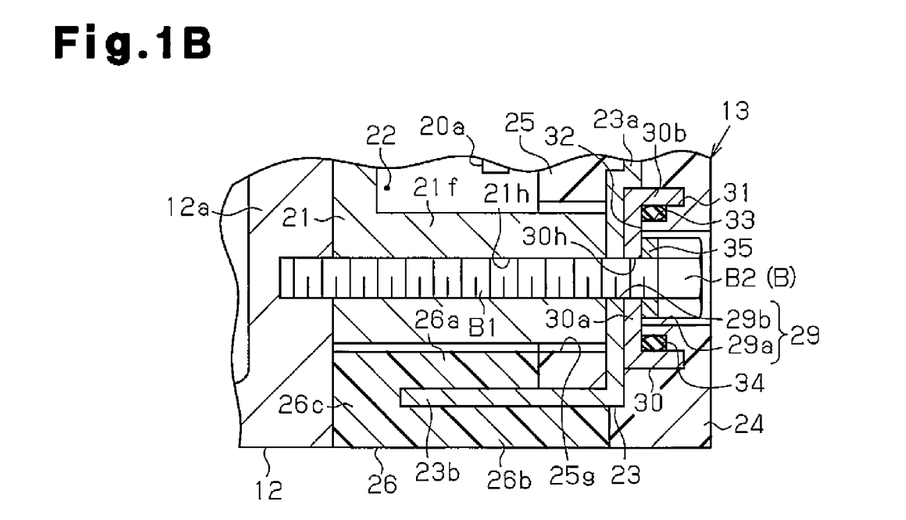
FIG. 1B is an enlarged cross-sectional view showing the outer circumferential portion of the cover of the motor-driven compression of FIG. 1A.

As shown in FIG. 1B, the outer circumferential portion of the outer insulator 24 and the outer circumferential portion of the inner insulator 25 are joined to each other by an annular resin joint 26. The joint 26 includes an inner joint portion 26a located at the inner side of the tubular portion 23b of the shield 23. The inner joint portion 26a is continuous with the outer circumferential portion of the inner insulator 25. The joint 26 also includes an outer joint portion 26b located at the outer side of the tubular portion 23b of the shield 23. The outer joint portion 26b is continuous with the outer circumferential portion of the outer insulator 24. Further, the joint 26 includes a connection portion 26c located at the distal end of the tubular portion 23b of the shield 23. The connection portion 26c connects the inner joint portion 26a to the outer joint portion 26b.

Figure 2:
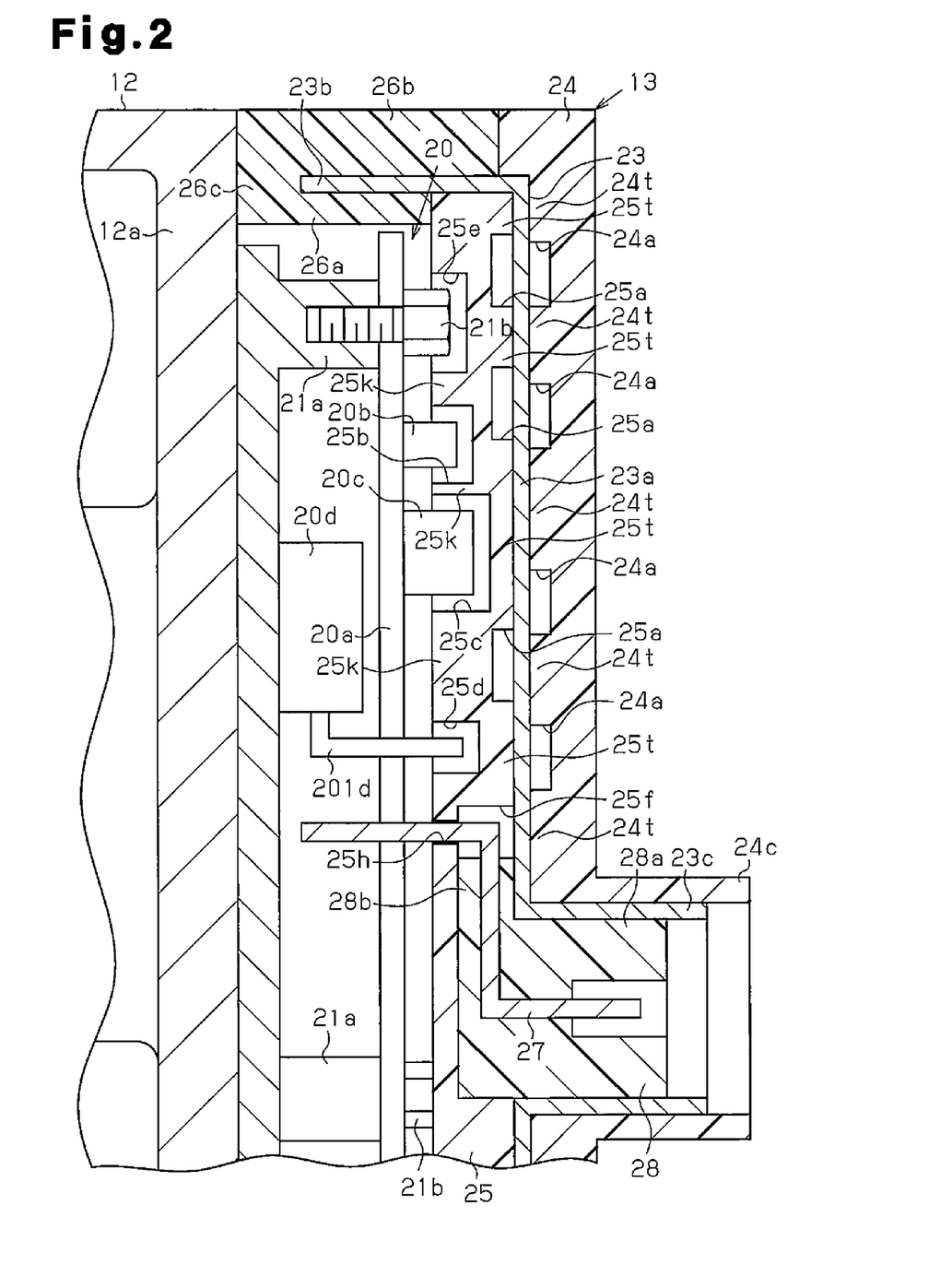
FIG. 2 is an enlarged cross-sectional view showing electric components of a motor driving circuit and connector portions.

As shown in FIG. 2, the inner surface of the outer insulator 24 faces the motor driving circuit 20 (faces the shield 23) and includes recesses 24a, where the outer insulator 24 does not contact the shield 23, and projections 24t, where the outer insulator 24 contacts the shield 23. The outer surface of the inner insulator 25 faces away from the motor driving circuit 20 (faces the shield 23) and includes recesses 25a, where the inner insulator 25 does not contact the shield 23, and projections 25t, where the inner insulator 25 contacts the shield 23. Further, the inner surface of the inner insulator 25 faces toward the motor driving circuit 20 and includes recesses 25b to 25e. Due to the recesses 25b and 25c, interference is avoided between the inner insulator 25 and the electric components 20b and 20c. Due to the recess 25d, interference is avoided between the inner insulator 25 and the distal end of a lead 201d extending from the electric component 20d toward the inner insulator 25. Due to the recess 25e, interference is avoided between the inner insulator 25 and a coupling bolt 21b. In addition, the inner surface of the inner insulator 25 includes projections 25k extending between the electric components 20b and 20c, the lead 201d of the electric component 20d, and the coupling bolt 21b.

The outer surface of the lid 23a of the shield 23 includes a tubular inner connector portion 23c extending in the axial direction of the rotation shaft 19. The outer surface of the outer insulator 24 that faces away from the motor driving circuit 20 (and the shield 23) includes a tubular outer connector portion 24c extending in the axial direction of the rotation shaft 19. The inner connector portion 23c is located at the inner side of the outer connector portion 24c.

A connector 28 is fixed between the shield 23 and the inner insulator 25. The connector 28 includes a metal terminal 27 electrically connected to an external power supply (vehicle battery). The metal terminal 27 includes a first end portion and a second end portion that is opposite to the first end portion. The connector 28 also includes a holding portion 28a and a flange 28b. The holding portion 28a is located in the inner connector portion 23c of the shield 23 and holds the first end portion of the metal terminal 27. The flange 28b extends from the proximal end of the holding portion 28a toward the second end portion of the metal terminal 27. The first end portion of the metal terminal 27 is extended through a recess in the distal end of the holding portion 28a and exposed to the exterior so as to be connected to the external power supply.

The outer surface of the inner insulator 25 includes an accommodation recess 25f that accommodates the proximal end of the holding portion 28a and the flange 28b. The flange 28b is held and positioned between the bottom of the accommodation recess 25f and the lid 23a of the shield 23. The section of the inner insulator 25 defining the bottom of the accommodation recess 25f includes an insertion hole 25h that receives the second end portion of the metal terminal 27. The second end portion of the metal terminal 27 is extended through the insertion hole 25h and electrically connected to the circuit board 20a.

As shown in FIG. 1B, the surface of the coupling base 21 opposite to the end wall 12a of the suction housing member 12 includes a plurality of bosses 21f (only one shown in FIG. 1B) extending in the axial direction of the rotation shaft 19. Each boss 21f includes a flat distal end that is in contact with the inner surface of the lid 23a of the shield 23. The boss 21f extends through a through hole 25g formed in the inner insulator 25. In addition, each boss 21f includes a through hole 21h.

The cover 13 includes insertion holes 29 into which bolts B are insertable. Each insertion hole 29 includes a first insertion hole 29a, which is formed in the outer insulator 24, and a second insertion hole 29b, which is formed in the shield 23. The first insertion hole 29a has a larger diameter than the second insertion hole 29b. The first insertion hole 29a is aligned with the second insertion hole 29b. Each bolt B includes a threaded rod B1 and a head B2, which is located at the proximal end of the rod B1.

A spacer 30 is arranged between the head B2 of each bolt B and the shield 23. The spacer 30 is made of a metal, preferably aluminum, and forms a portion of the shield 23. The spacer 30 includes a flat end portion 30a and a tubular portion 30b extending from the rim of the end portion 30a perpendicular to the end portion 30a. The end portion 30a includes an insertion hole 30h into which the rod B1 of the bolt B is insertable. The rod B1 is inserted through the first insertion hole 29a, the insertion hole 30h, the second insertion hole 29b, and the through hole 21h. Then, the rod B1 is fastened to the end wall 12a of the suction housing member 12. This couples the cover 13 to the end wall 12a of the suction housing member 12. The coupling base 21 is arranged between the cover 13 and the end wall 12a.

The inner surface of the outer insulator 24 includes annular grooves 31. Accommodation recesses 32 are formed between the inner surface of the outer insulator 24 and the shield 23. Each annular groove 31 receives the tubular portion 30b of the corresponding spacer 30, and each accommodation recess 32 accommodates the end portion 30a of the corresponding spacer 30.

The outer insulator 24 also includes a seal accommodation groove 33 located at the inner side of each annular groove 31. The seal accommodation grooves 33 are annular and continuous with the corresponding ones of the annular grooves 31 and the accommodation recesses 32. Each seal accommodation groove 33 accommodates an annular sealing member 34 surrounding the first insertion hole 29a. The sealing member 34 is held between the inner surface of the tubular portion 30b of the spacer 30 and the wall of the seal accommodation groove 33 that faces the inner surface of the tubular portion 30b. Thus, the sealing member 34 is compressed in a direction perpendicular to the axis of the rod B1 of the bolt B. The sealing member 34 seals the gap between the shield 23 and the outer insulator 24.

The head B2 of each bolt B is located in the corresponding first insertion hole 29a. A washer 35 is arranged between the end portion 30a of each spacer 30 and the head B2 of the corresponding bolt B in the axial direction of the rod B1 of the bolt B. The washer 35, which is made of a metal, preferably aluminum, surrounds the rod B1. The washer 35 seals the gap between the end portion 30a of the spacer 30 and the head B2 of the bolt B. The section of the shield 23 surrounding the second insertion hole 29b is held between the head B2 of the bolt B and the boss 21f. The axial force of the bolt B is applied to this section through the spacer 30 and the washer 35 without being applied to the outer insulator 24 or the inner insulator 25.

The method for manufacturing the cover 13 will now be described.

Figure 3:
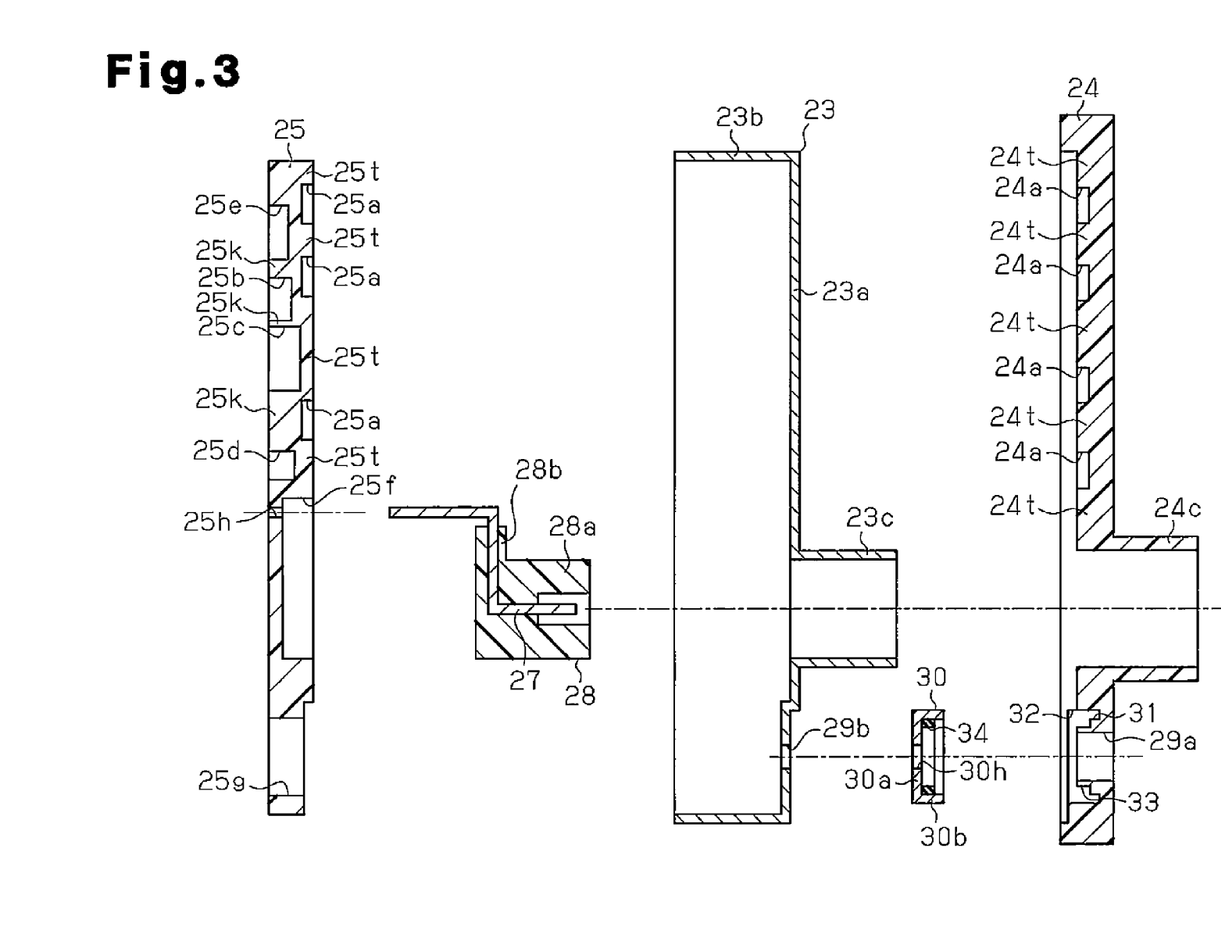
FIG. 3 is an exploded cross-sectional view of the cover.

Referring to FIG. 3, the outer insulator 24 and the inner insulator 25 are separately molded in advance. Then, the connector 28 is attached to the inner insulator 25 so that the insertion hole 25h receives the second end portion of the metal terminal 27 and the accommodation recess 25f accommodates the proximal end of the holding portion 28a and the flange 28b of the connector 28. Then, the shield 23 is attached to the outer surface of the inner insulator 25. This positions the holding portion 28a in the inner connector portion 23c.

Then, the spacer 30, which accommodates the sealing member 34, is arranged in the annular groove 31 and the accommodation recess 32 of the outer insulator 24. The outer insulator 24 is then attached to the outer surface of the lid 23a of the shield 23. This positions the inner connector portion 23c in the outer connector portion 24c. In addition, the shield 23 is held between the outer insulator 24 and the inner insulator 25.

Figure 4A:
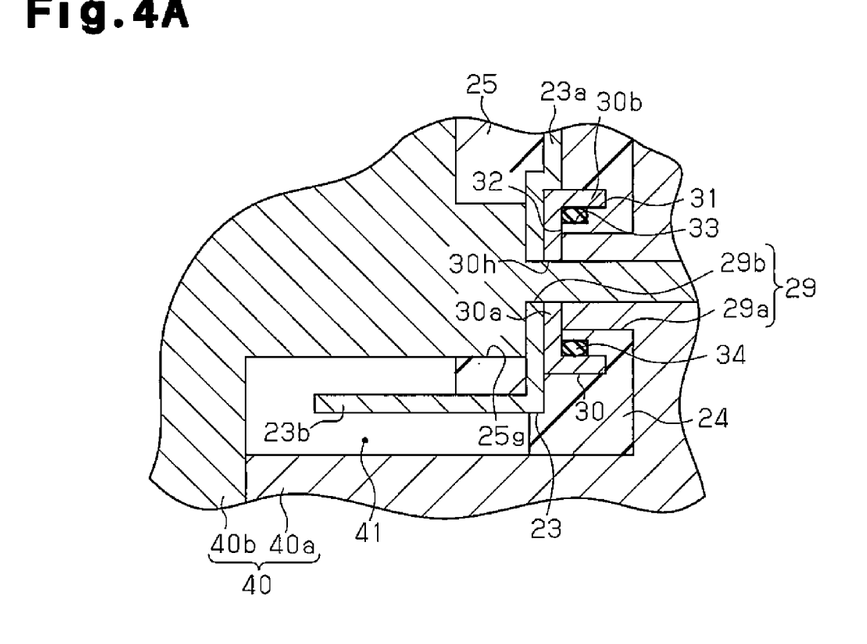
FIG. 4A is a cross-sectional view showing a mold before being filled with molten resin.

As shown in FIG. 4A, the shield 23, the outer insulator 24, and the inner insulator 25 are arranged in a mold 40, which includes a first mold member 40a and a second mold member 40b. This forms a filling cavity 41 in the mold 40. The filling cavity 41 extends from the outer circumferential portion of the outer insulator 24, passes beside the distal end of the tubular portion 23b of the shield 23, and extends to the outer circumferential portion of the inner insulator 25.

Figure 4B:
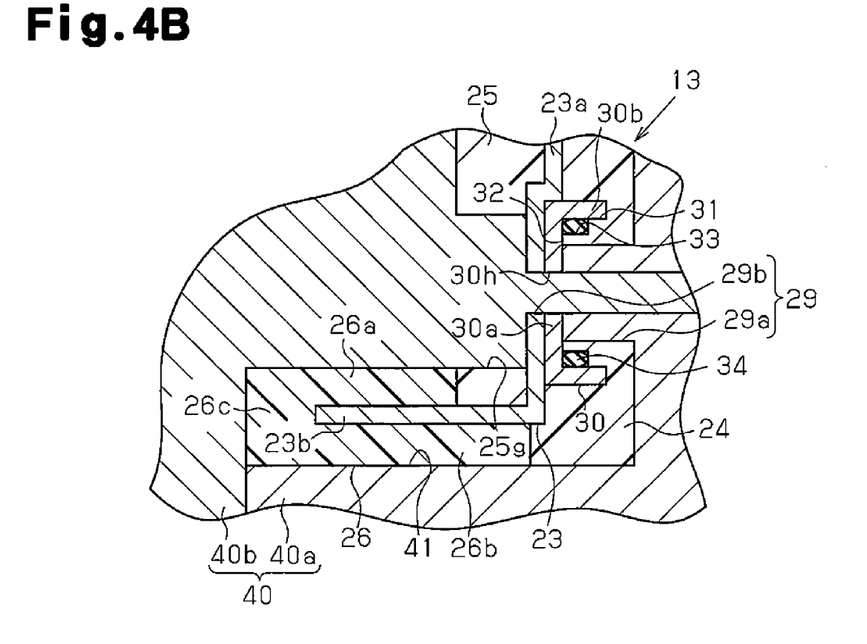
FIG. 4B is a cross-sectional view showing the mold after being filled with molten resin.

As shown in FIG. 4B, the filling cavity 41 is filled with molten resin, which is then hardened. This forms the joint 26 in the filling cavity 41. The joint 26 joins the outer circumferential portion of the outer insulator 24 to the outer circumferential portion of the inner insulator 25. This forms the three-layered cover 13, in which the outer insulator 24 is fixed to the outer surface of the shield 23, and the inner insulator 25 is fixed to the inner surface of the shield 23. When the cover 13 is removed from the mold 40 and returned to room temperature, the joint 26 undergoes thermal contraction. This forms the cover 13 that has the desired shape and high dimensional accuracy.

The operation of the present embodiment will now be described.

The cover 13 is formed just by joining the outer circumferential portion of the outer insulator 24 to the outer circumferential portion of the inner insulator 25 with the joint 26 when the shield 23 is held between the outer insulator 24 and the inner insulator 25. This limits overall thermal contraction of the shield 23, the outer insulator 24, and the inner insulator 25 that would be caused if molding were performed to form the three-layered cover 13. If the three-layered cover 13 were formed by performing molding, the shield 23, the outer insulator 24, and the inner insulator 25 may deform if those portions do not contract smoothly. In this regard, the present embodiment limits such deformation. This allows the cover 13 to have the desired shape and high dimensional accuracy.

The motor-driven compressor 10 is installed in a vehicle. Thus, the heat from the vehicle engine and the heat of the ambient air may deform the cover 13. However, the recesses 24a, 25a, 25b, 25c, 25d and 25e and the projections 24t, 25k and 25t limit deformation of the cover 13 caused by heat. This improves the durability of the cover 13.

The sealing member 34 is located between the outer insulator 24 and the spacer 30. The sealing member 34 seals the gap between the outer insulator 24 and the spacer 30, that is, the sealing member 34 seals the gap between the shield 23 and the outer insulator 24. Thus, the sealing member 34 ensures the sealing between the shield 23 and the outer insulator 24. This blocks entry of foreign matter such as water and dust into the accommodation chamber 22 through the gap between the shield 23 and the outer insulator 24.

Further, the sealing member 34 surrounds the first insertion hole 29a. This blocks entry of foreign matter from the first insertion hole 29a into the accommodation chamber 22 through the gap between the shield 23 and the outer insulator 24 when coupling the cover 13 to the suction housing member 12 with the bolt B.

The section of the shield 23 surrounding the second insertion hole 29b is held between the head B2 of the bolt B and the boss 21f. The axial force of the bolt B is applied to this section through the spacer 30 and not applied to the outer insulator 24 or the inner insulator 25. When coupling the cover 13 to the suction housing member 12 with the bolt B, the outer insulator 24 and the inner insulator 25 are not held between the head B2 and the boss 21f. Thus, the axial force of the bolt B does not deform the outer insulator 24 or the inner insulator 25. This avoids deterioration in the sealing of the suction housing member 12 with the cover 13 that would be caused when the outer insulator 24 or the inner insulator 25 deforms and loosens the bolt B.

The advantages of the present embodiment will now be described.

(1) The cover 13, which includes the shield 23, the outer insulator 24, and the inner insulator 25 that are separate from one another, is formed by joining the outer circumferential portion of the outer insulator 24 to the outer circumferential portion of the inner insulator 25 with the joint 26 when the shield 23 is held between the outer insulator 24 and the inner insulator 25. Thus, the three-layered cover 13, in which the shield 23, the outer insulator 24, and the inner insulator 25 are integrated, can by formed by just joining the outer circumferential portion of the outer insulator 24 to the outer circumferential portion of the inner insulator 25 when the shield 23 is held between the outer insulator 24 and the inner insulator 25. This limits overall thermal contraction of the shield 23, the outer insulator 24, and the inner insulator 25 that would be caused if the three-layered cover 13 were formed by molding. In the three-layered cover 13 that is formed by molding, the shield 23, the outer insulator 24, and the inner insulator 25 may deform if those portions do not contract smoothly. The present embodiment limits such deformation. This allows the cover 13 to have the desired shape and high dimensional accuracy.

(2) The outer insulator 24 and the inner insulator 25 include the recesses 24a and 25a where contact with the shield 23 does not occur, and the projections 24t and 25t, where contact with the shield 23 occurs. Compared to a structure in which the entire surface of the outer insulator 24 that faces the shield 23 and the entire surface of the inner insulator 25 that faces the shield 23 are in close contact with the shield 23, the recesses 24a and 25a and the projections 24t and 25t limit deformation of the cover 13 that may be caused by heat. This improves the durability of the cover 13.

(3) The inner insulator 25 includes the recesses 25b, 25c, 25d and 25e so that the inner insulator 25 does not interfere with the electric components 20b and 20c, the lead 201d of the electric component 20d, and the coupling bolt 21b. The inner insulator 25 also includes the projections 25k extending between the electric components 20b and 20c, the lead 201d of the electric components 20d, and the coupling bolt 21b. The recesses 25b, 25c, 25d and 25e allow the distance to be minimized between the inner insulator 25 and the motor driving circuit 20. This reduces the size of the motor-driven compressor 10. In addition, the projections 25k reinforce the inner insulator 25.

(4) The joint 26 joins the outer circumferential portion of the outer insulator 24 and the outer circumferential portion of the inner insulator 25. This allows for easy connection of the outer circumferential portion of the outer insulator 24 and the outer circumferential portion of the inner insulator 25.

(5) The connector 28, which is electrically connected to the external power supply, is fixed between the shield 23 and the inner insulator 25. This allows the connector 28 to be fixed just by holding the connector 28 between the shield 23 and the inner insulator 25.

(6) The sealing member 34, which blocks entry of foreign matter into the accommodation chamber 22, is located between the shield 23 and the outer insulator 24. The sealing member 34 seals the gap between the shield 23 and the outer insulator 24. Thus, the sealing member 34 ensures the sealing between the shield 23 and the outer insulator 24. This blocks entry of foreign matter into the accommodation chamber 22 through the gap between the shield 23 and the outer insulator 24.

(7) The sealing member 34 is compressed in a direction perpendicular to the axis of the bolt B. If the sealing member 34 were compressed in the axial direction of the bolt B, for example, the sealing member 34 would produce a resilient force that acts to restore the original shape of the sealing member 34. This would create a gap between the shield 23 and the outer insulator 24. The present embodiment avoids such a problem.

(8) The sealing member 34 surrounds the first insertion hole 29a. This blocks entry of foreign matter from the first insertion hole 29a into the accommodation chamber 22 through the gap between the shield 23 and the outer insulator 24 when coupling the cover 13 to the suction housing member 12 with the bolt B.

(9) The section of the shield 23 surrounding the second insertion hole 29b is held between the head B2 of the bolt B and the boss 21f. The axial force of the bolt B is applied to this section through the spacer 30 and not applied to the outer insulator 24 or the inner insulator 25. When coupling the cover 13 to the suction housing member 12 with the bolt B, the outer insulator 24 and the inner insulator 25 are not held between the head B2 and the boss 21f. Thus, the axial force of the bolt B does not deform the outer insulator 24 or the inner insulator 25. This avoids deterioration in the sealing between the suction housing member 12 and the cover 13 that would be caused when the outer insulator 24 or the inner insulator 25 deforms and loosens the bolt B.

(10) If the outer insulator 24 and the inner insulator 25 were formed by filling a mold with molten resin at the outer and inner sides of the shield 23 and then hardening the molten resin, a pin would have to be arranged in the mold to hold and fix the shield 23 in the mold. However, this would form an unnecessary hole in the molded outer insulator 24 or the inner insulator 25 at the position where the pin was located during the molding. In the present embodiment, the outer insulator 24 and the inner insulator 25 are separately molded in advance and thus do not include an unnecessary hole. This improves the quality of the cover 13.

(11) In addition, if the outer insulator 24 and the inner insulator 25 were formed by filling a mold with molten resin at the outer and inner sides of the shield 23 as described above, limitations would be imposed to the shapes of the outer insulator 24 and the inner insulator 25 due to the limitation in the direction in which the molded cover is removed from the mold. However, in the present embodiment, the outer insulator 24 and the inner insulator 25 are molded in advance and have the desired shape and high dimensional accuracy. Thus, unnecessary portions may be omitted from the outer insulator 24 and the inner insulator 25. This reduces the weight of the cover 13.

It should be apparent to those skilled in the art that the present invention may be embodied in many other specific forms without departing from the spirit or scope of the invention. Particularly, it should be understood that the present invention may be embodied in the following forms.

The outer circumferential portion of the lid 23a of the shield 23 may include a through hole, and the outer insulator 24 may include a projection extending through the through hole of the lid 23a so that the joint 26 and the projection are joined to each other. In this case, in addition to the connection between the outer circumferential portion of the outer insulator 24 and the outer circumferential portion of the inner insulator 25 by the joint 26, the connection between the joint 26 and the outer insulator 24 by the projection is achieved. This strengthens the assembly of the shield 23, the outer insulator 24, and the inner insulator 25.

Each of the outer insulator 24 and the inner insulator 25 may include an outer circumferential portion that extends in the axial direction of the rotation shaft 19 beyond the distal end of the tubular portion 23b of the shield 23. In this case, the outer circumferential portions of the outer and inner insulators 24 and 25 may be joined to each other by melting and then hardening the distal ends of the outer circumferential portions together.

The number of recesses 24a and 25a of the insulators 24 and 25 is not limited as long as the strength of the insulators 24 and 25 is ensured.

The outer insulator 24 does not have to include the recesses 24a or the projections 24t.

The inner insulator 25 does not have to include the recesses 25a or the projections 25t.

The inner surface of the inner insulator 25 does not have to include the recesses 25b, 25c, 25d and 25e or the projections 25k.

The connector 28 may be fixed between the shield 23 and the outer insulator 24.

The sealing member 34 may be compressed in the axial direction of the bolt B.

The sealing member 34 may be compressed in a direction that intersects the axis of the bolt B.

The shield 23 may be made of a conductive material such as iron or copper.

The outer insulator 24 and the inner insulator 25 may be made of different materials. For example, the outer insulator 24 may be made of a resin that has a high corrosion resistance, and the inner insulator 25 may be made of a resin that has a high strength.

The coupling base 21 may be omitted.

The washer 35 may be omitted. In this case, the spacer 30 functions as a washer.

A sealing member may be arranged between the joint 26 of the cover 13 and the end wall 12a of the suction housing member 12.

The compression unit 15, the electric motor 16, and the motor driving circuit 20 do not have to be arranged in this order in the axial direction of the rotation shaft 19. For example, the cover 13 may be fixed to the circumferential wall of the suction housing member 12, and the motor driving circuit 20 may be accommodated in an accommodation chamber defined by the circumferential wall of the suction housing member 12 and the cover 13.

The compression unit 15 may be of a piston type or a vane type, for example

The motor-driven compressor 10 is not limited to vehicle air-conditioning devices and is applicable to other air-conditioning devices.

The present examples and embodiments are to be considered as illustrative and not restrictive and the invention is not to be limited to the details given herein, but may be modified within the scope and equivalence of the appended claims.

The invention claimed is:

1. A motor-driven compressor comprising:
a metal housing accommodating a compression unit and an electric motor; and
a cover coupled to the housing, wherein the cover and the housing define an accommodation chamber that accommodates a motor driving circuit that drives the electric motor, wherein
the cover includes
a metal shield that blocks electromagnetic noise,
a resin outer insulator that is fixed to an outer side of the shield and includes a radially outer circumferential portion, and
a resin inner insulator that is fixed to an inner side of the shield and includes a radially outer circumferential portion,
the shield, the outer insulator, and the inner insulator are separate from one another and stacked together,
the shield is held between the outer insulator and the inner insulator,
the radially outer circumferential portion of the outer insulator is joined to the radially outer circumferential portion of the inner insulator,
the outer insulator has a surface that faces the shield, and the inner insulator has a surface that faces the shield, and
at least one of the surface of the outer insulator and the surface of the inner insulator includes a recess, where contact does not occur with the shield, and a projection, where contact occurs with the shield.

2. The motor-driven compressor according to claim 1, wherein
the motor driving circuit includes a plurality of components, and
the inner insulator includes a recess, which is configured so that the inner insulator does not interfere with at least one of the components, and a projection, which extends between the components.

3. The motor-driven compressor according to claim 1, further comprising a resin joint that joins the radially outer circumferential portion of the outer insulator and the radially outer circumferential portion of the inner insulator.

4. The motor-driven compressor according to claim 1, further comprising a connector electrically connected to an external power supply, wherein the connector is fixed between the shield and one of the outer insulator and the inner insulator.

5. The motor-driven compressor according to claim 1, further comprising a sealing member located between the shield and the outer insulator, wherein the sealing member is configured to block entry of foreign matter into the accommodation chamber through a gap between the shield and the outer insulator.

6. The motor-driven compressor according to claim 1, further comprising a rotation shaft accommodated in the housing and rotated integrally with a rotor of the electric motor, wherein the compression unit, the electric motor, and the motor driving circuit are arranged in this order along an axis of the rotation shaft.

7. The motor-driven compressor according to claim 1, wherein the recess and the projection face the shield in an axial direction of the electric motor, and the projection comes into contact with the shield in the axial direction of the electric motor.

<p style="text-align:center">* * * * *</p>